Oct. 23, 1945.　　　G. BOULET　　　2,387,560
AIRCRAFT POWER PLANT FOR HIGH ALTITUDE FLIGHT
Filed Nov. 16, 1939
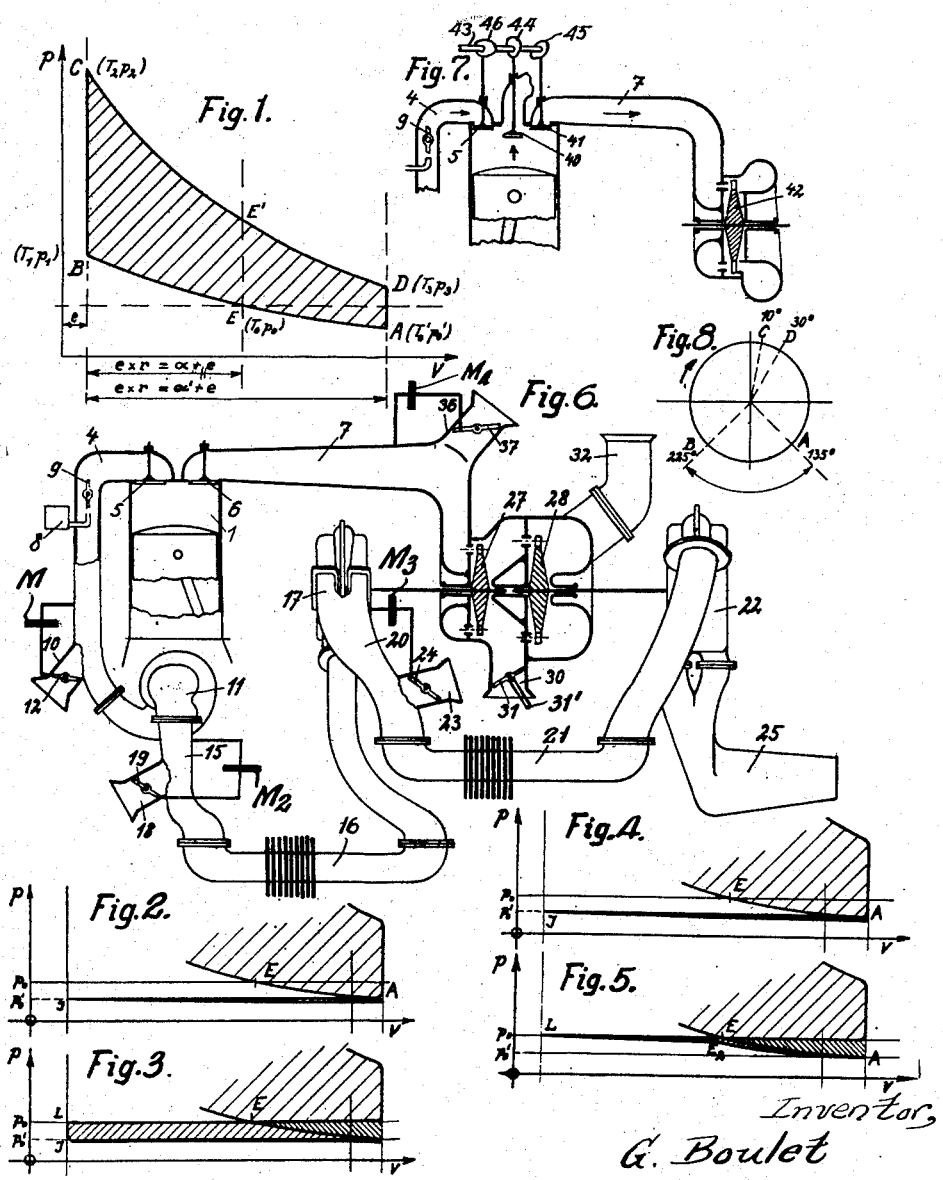
Inventor,
G. Boulet
By: Glascock Downing & Seebold
Attys.

Patented Oct. 23, 1945

2,387,560

UNITED STATES PATENT OFFICE 2,387,560

AIRCRAFT POWER PLANT FOR HIGH ALTITUDE FLIGHT

Georges Boulet, Plessis-Robinson, France; vested in the Alien Property Custodian Application November 16, 1939, Serial No. 304,834
In France November 26, 1938

4 Claims. (Cl. 60—13)

My present invention has for its object to provide an aircraft internal combustion engine for flight at high altitude, more especially in the stratosphere, which is more particularly intended for long distances and has a low specific consumption, which is ensured by its cycle of operation, independently of the other known means that may likewise act to decrease such consumption (adjustable richness carburettor, injection of gasoline into the pipes or into the cylinder, injection of additional liquid, special chamber, etc.), said low consumption existing at its normal altitude of operation and preferably also under all conditions of operation at any intermediate altitude.

A further object of my invention is to provide an aircraft engine having a substantially constant power at all altitudes.

A further object of my invention is to provide in the usual combination of an engine of the explosion type and a system of air compression an engine of the high volumetric ratio type (higher than 8 to 1) and undercharged, that is to say wherein the pressure $p'_0$ at the end of the intake stroke with the throttle wide open is lower than the atmospheric pressure on the ground. This pressure $p'_0$ is dependent on the octane index of the fuel that can be employed in normal operation at the altitudes in question.

The undercharging may be obtained either by means of a throttling of the intake, or preferably by means of a distribution which is adjustable in flight, or by means of unequal strokes of the piston, etc.

The adjustable distribution enables when on the ground a small overlap to be obtained of the periods of closing of the exhaust and of opening of the intake, and a substantially greater overlap to be obtained at the altitude $Z_1$ (at which the external pressure is $p'_0$), which permits of a very considerable scouring (in particular a scouring by pure air in the case of gasoline injection), which favours the cooling of the chamber and increases its ability to support a higher volumetric ratio.

In the case of injection of gasoline directly into the combustion chamber, the under-charging by means of adjustable distribution may be effected on the ground by means of a delay or storing, that is to say that the closing (of the intake valve or valves or of the intake distributor or distributors) will be late, thereby driving the air into one or other of the pipes, preferably the intake pipe, the adjustment becoming normal again at the altitude $Z_1$ called reference altitude.

Similarly, the delay might be considered in engines provided with carburettors with a buffer chamber between the cylinders and the members controlling the intake.

Similarly a system called after-charging might be considered, in which the intake at the pressure $Z_1$ takes place at that part of the end of the intake stroke during which the piston only undergoes small movements.

Similarly turbines might be considered which operate on the exhaust "puff"; they would be called variable pressure turbines.

Furthermore, since the pressure to be restored is much lower, the temperatures at the end of the compression are lower and the air radiators smaller.

On the other hand, at the instant when the quick climb stops and when the flight continues with a very gentle climb, as the aeroplane becomes lighter, the mechanical compressor can be stopped and will then only act as a conveyor, or it can be cut out of the system and its action replaced by that of the dynamic pressure in the shaft. It will be reintroduced into the system when its action becomes necessary again, that is to say on the level located below the end of constant intake pressure altitude, by an amount corresponding to its compression ratio.

In order to enable the invention to be better understood, reference is made to the following description and the appended drawing illustrating application of the invention, wherein:

Figure 1 is a diagram of a cycle of operation.

Figs. 2 to 5 show partial diagrams at different altitudes of under-charged engines.

Fig. 6 shows diagrammatically, by way of a non-limitative example, an embodiment provided with the various features mentioned above.

Figs. 7 and 8 show diagrammatically a modified embodiment.

In the complex embodiment shown in Fig. 6, the basic combination of the whole arrangement is formed by that of an under-charged engine shown diagrammatically at 1 and by a compressor 11. The general cycle of the type of engine 1 is shown in Fig. 1.

Fig. 1 shows the theoretical diagram corresponding to the (adiabatic) compression stroke (AB) and the (adiabatic) expansion stroke (CD). This diagram remains the same whatever be the manner in which the under-charging is effected.

The consequences of two different manners of effecting the under-charging are shown in Figs. 2 to 5 which are figurative diagrams of the intake and exhaust strokes. Figs. 2 and 3 relate to an engine which is under-charged by throttling the intake, Figs. 4 and 5, an engine which is under-charged by closing the intake valve long before the end of the stroke of the piston.

Fig. 2 shows the operating diagram at the altitude at which the end of intake pressure $p'_o$ prevails, whereas the diagram of Fig. 3 is that of the operation at the altitude $o$. It will be seen that in this latter case there exists a work of suction represented by the area AELJ which is far from being negligible. This loss has almost entirely disappeared in the diagram of Fig. 5 in which the under-charging is obtained by closing the intake valve at a point $E_2$ corresponding to an intermediate position II of the piston in its intake stroke which is chosen in such a manner that the mass introduced expands during the remainder of the intake stroke according to the adiabatic curve $E_2$ A which is as close as possible to the adiabatic curve A E of the compression stroke of the general cycle (Fig. 1). The diagram of Fig. 4 is equivalent to that of Fig. 2, save that this particular manner of undercharging the engine by varying the instant of closing the intake valve enables the intake valve to be closed at the altitude $p_o$ only after the closing of the exhaust valve and thereby enables a scouring to be obtained which has the effect of increasing the power owing to the fact that the cylinder is entirely cleansed of burnt gases and is consequently filled with a more considerable mass of fresh gas than when burnt gases remain; furthermore, the volumetric ratio of the combustion chamber can be made higher owing to the cooling of the combustion chamber by the fresh gases and to the lower temperature of the mass at the end of the intake.

In this embodiment of Fig. 6, the engine 1 is of the high volumetric compression type, for example higher than 9 to 1 and has two valve-operating camshafts angularly displaceable during the operation of the engine, for example by means of a device of the type described in my Patent No. 1,787,717 dated Jan. 6, 1931. 4 designates the intake pipe, 5 the intake valve, 6 the exhaust valve, 7 the exhaust pipe, 8 a usual supply carburettor and 9 the usual butterfly valve for controlling the power of the engine; 10 is an air intake located on the intake pipe after a compressor 11 which is mechanically driven by the motor 1; 12 is a throttle valve for the air intake 10 and is controlled by a manometric capsule M and subjected to the influence of the pressure prevailing in the intake pipe 4. On the intake pipe of the compressor 11 which is connected through a pipe 15 and a cooler 16 to the delivery pipe of another compressor 17, is arranged at 18 an air intake direct from the atmosphere, which air intake is controlled by a valve 19 controlled by a manometric capsule $M_2$ and subjected to the pressure that prevails in the pipe 15 as shown. Said compressor 17 has its intake pipe connected through a pipe 20 and a cooler 21 to the delivery pipe of another compressor 22, and 23 designates a direct air intake arranged on the intake pipe of the compressor 17; a valve 24 controls said air intake 23 and is actuated by a manometric capsule $M_3$ subjected to the pressure in the pipe 20 as shown. The air intake of the compressor 22 is shown at 25.

The compressors 17, 22 are each respectively mounted on the shaft of a turbine 27, 28. Said turbines are coaxial and their outer case is common but divided into two compartments each containing one of the wheels 27, 28. It is into the compartment of the wheel 27 which drives the compressor 17 that the exhaust pipe 7 leads and said compartment is provided with a direct exhaust pipe 30 controlled by a valve 31. The compartment of the wheel 28 is likewise provided with an exhaust pipe 32 opening directly into the atmosphere, without a valve, and it communicates with the other compartment. Finally, on the exhaust pipe 7 is arranged between the engine and the turbines an exhaust pipe 36 controlled by a valve 37 which is actuated by a manometric capsule $M_4$ subjected to the pressure prevailing in the exhaust pipe 7.

The operation of this arrangement is as follows:

On the ground, all the valves 12, 19, 24, 30 and 37 are open. The engine is designed to operate at an inlet pressure of $p'_o$ (for instance 405 mm.) which pressure is that prevailing at an altitude $Z_1$ (5,000 metres for instance), and this is obtained by appropriately covering up the opening periods of the intake valves 5 and of the exhaust valves, by means of the angularly displaceable camshaft (not shown); the settings from the upper dead centre are for example +0 and +130 for the opening and the closing of the intake valve 5 and +135 and +10 for the opening and the closing of the exhaust valve. The exhaust takes place through the pipe 36, the valve 37 being wide open. Up to the altitude $Z_1$, the intake pressure remains the same by an appropriate adjustment of the angularly displaceable camshaft. The setting at $Z_1$ is for example −10 and +225 for the intake valve 5 and +135 and +30 for the exhaust valve 6. At $Z_1$ the valve 12 is closed by hand. The valve 12 and the valves 19 and 24 are closed gradually and they are arranged to open again if excessive pressure appears. At the same time, the mechanical compressor 11 is started if same is not constantly driven by the engine. In practice, the compressor 11 need not be operated until the aircraft has reached a certain altitude, but no difficulty would be encountered if this compressor were operated constantly, because at low altitudes the vent 12 would discharge sufficient air to maintain the desired pressure on the engine. Vent valves 31 and 37 are operated similarly to the valve 12. The suction then takes place when the compressor 11 is started, through the air intake 18 and the valve 19 more or less throttles said air intake so that the intake pressure always remains equal to 405 mm. From an altitude $Z_e$ (6,500 metres for instance), the closing of the valve 37 starts and a portion of the exhaust gases passes through the turbine 27, thereby actuating the compressor 17 which drives air through the pipe 15 but at a pressure which is that determined by the valve 19. From the altitude $Z_e$ (6,500 metres) the cycle of the engine remains the same and its sole difference from the cycle up to the altitude $Z_1$ consists in the pressure drop in the exhaust from the pressure $p'_o$ corresponding to the altitude $Z_1$ to the pressure $p_e$ prevailing at the altitude $Z_e$, thereby producing an increase of power which partly compensates for the power absorbed by the mechanical compressor. At $Z_2$ (8,000 metres for instance), the maximum altitude at which the compressor 11 can restore the pressure of $p'_o$ (405 mm.), the valve 19 closes completely and the valve 37 is completely closed; the exhaust is then effected completely through the turbine 27 and the pipe 30, while the air intake takes place through the pipe 23 which is suitably throttled by the valve 24 so that the intake pressure is constant. The turbine 27 operates at that instant at a pressure drop equal to the difference of the pressures at $Z_e$ and $Z_2$ (8,000 metres) and the compressors 17 and 11 act in series and restore the pressure at 405 mm. up to the altitude $Z_3$ (11,500 metres for instance). Towards this altitude $Z_3$ or slightly before, (towards 10,700 metres for example), the closing of the valve 31 is effected by a hand lever 31' so that the exhaust then takes place through the two wheels 27 and 28 in series and the pipe 32; then at $Z_3$ the valve 24 closes, so that the supply of air to the engine is effected through the pipe 25 and the passage of the air successively through the three compressors 22, 17 and 11, which restore the pressure of 405 mm. up to an altitude $Z_4$ (15,000 metres for instance).

The power of the engine 1 therefore remains substantially constant between 0 and 15,000 metres. Above $Z_4$ (15,000 metres) there is a decrease of power of the engine.

In the modified embodiment of Fig. 7, the engine is provided, in addition to its normal exhaust valve 40, with a special exhaust valve 41, or with a similar device called "puff" device, that is to say which opens astride on the lower dead centre, at which instant the piston is nearly stationary and opens into a pipe leading to a variable pressure turbine 42. The valve 41 is controlled in the usual manner by means of a camshaft. The valve 40 may be controlled as described in my patent, No. 1,787,717, supra, in order to be adjustable in flight. Cams 44 and 45 on the camshaft 43 may be provided to operate the valves 40 and 41, respectively, and a cam 46 to operate the intake valve 5. The auxiliary exhaust valve 41 is arranged to be open during the initial portion of the exhaust stroke of the piston, the main exhaust valve 40 being open during the remainder of the exhaust stroke.

Fig. 8 gives an example of such a control; in this example, the puff valve 41 opens only from A to B at the beginning of the exhaust stroke and then recloses. The normal valve 40 opens from B to C at ground level but from B to D at an altitude of 5,000 meters.

Of course, the invention is in no way limited to the details of construction illustrated or described, which have only been given by way of example. Thus, the numerical data given above are in no way absolute and the plant described could be designed to operate between other limits of altitude without thereby exceeding the scope of the invention. The same applies to the location and to the number of the members such as carburettors, radiators, etc.

While I have described what I at present consider preferred embodiments of my invention, it will be obvious to those skilled in the art that various changes and modifications may be made without departing from my invention.

What I claim is:

1. In an aircraft engine of the character described wherein air may be supplied to the cylinders directly from the atmosphere when the atmospheric pressure is of a proper value and wherein a compressor is provided to supply air when atmospheric pressure is below the desired value, the combination with the compressor of a plurality of auxiliary compressing units adapted to be driven individually and to supply air partially compressed to said compressor, conduit means connecting said auxiliary compressing units in series whereby the air is compressed in stages when the units are operated, cooling means to cool the air passed from each of said auxiliary compressing units before it is compressed further, and a valve-control assembly comprising a plurality of valves and a plurality of individually operating control units providing vents which may be opened to atmosphere at the outlet of each of said auxiliary compressing units whereby the pressure of the air supplied by the particular unit is maintained substantially constant while the unit is operating, and a plurality of turbines individually operable and connected respectively to the auxiliary compressing units with each turbine being connected to be operated by the exhaust gases of the engine, and valve means to control the discharging of the gases directly to atmosphere or selectively to said turbines whereby said turbines individually operate their respective auxiliary compressing units.

2. Apparatus as described in claim 1 wherein said turbines are serially related and wherein the entire stream of exhaust gases may be passed through said turbines.

3. Apparatus as described in claim 1 wherein the engine is provided with a main exhaust passage leading to the atmosphere and an auxiliary exhaust passage connected with a turbine, and exhaust control means to discharge exhaust gases into the auxiliary exhaust passage during the initial portion of the exhaust stroke and to discharge exhaust gases into the main passage during the remainder of the exhaust stroke.

4. In combination with an internal combustion aircraft engine of the character wherein the air which is supplied with the fuel is to be maintained at a substantially predetermined value, an auxiliary compressing assembly to control the pressure of the air supplied to the engine and to compress the air when the pressure of the surrounding atmosphere is below the pressure then desired for the engine comprising, a plurality of individually operable rotary compressing units, a plurality of coolers, conduit means connecting said individual compressing units and said coolers in series, valve means including a plurality of individually operable valves positioned respectively to vent the discharge from each compressing unit to atmosphere, a plurality of pressure responsive control units connected respectively to each of said valves and each responsive to the air pressure on the inner side of its valve whereby its valve is moved toward its open position when the air pressure in the conduit is above a certain predetermined value, a plurality of individually operable turbines connected in series to the exhaust pipe from the engine to thereby expand the exhaust gases in stages when the turbines are operating, means connecting said turbines respectively to said compressing units whereby the compressing units are individually operated by controlling the operation of the respective turbines, valve means in the conduit carrying the exhaust gases to each turbine whereby the turbine is rendered inoperable by opening the valve and discharging the gases directly to the atmosphere, and control means to control the operation of the last-named valve means.

GEORGES BOULET.